United States Patent [19]

Santiago

[11] 4,272,587
[45] Jun. 9, 1981

[54] GLASS ARTICLE HAVING ABRASION RESISTANT AND LABEL RECEPTIVE COATING AND METHOD OF PRODUCING SAME

[75] Inventor: Edgardo Santiago, Toledo, Ohio

[73] Assignee: Owens-Illinois, Inc., Toledo, Ohio

[21] Appl. No.: 104,210

[22] Filed: Dec. 17, 1979

[51] Int. Cl.³ .............................................. B32B 17/06
[52] U.S. Cl. .................................... 428/432; 65/60 A; 65/60 B; 427/221; 428/441; 428/522; 428/523
[58] Field of Search ............. 65/60 A, 60 B; 427/221; 428/441, 432, 522, 523

[56] References Cited
U.S. PATENT DOCUMENTS 3,836,386  9/1974  Roy ................................ 65/60 A X

FOREIGN PATENT DOCUMENTS 2350960 11/1973 Fed. Rep. of Germany ........... 65/60 B Primary Examiner—Arthur D. Kellogg
Attorney, Agent, or Firm—E. J. Holler; M. E. Click; D. H. Wilson

[57] ABSTRACT

Glass surfaces are provided with abrasion-resistant and label receptive characteristics by forming a first layer of an oxide of tin or titanium thereon and then overcoating the first layer with a physical mixture of emulsified organic polymers including acrylic resin emulsion and polyethylene resin emulsion. The resins are present in the mixture in a solids ratio ranging from about 7:1 to 1:1.

10 Claims, No Drawings

GLASS ARTICLE HAVING ABRASION RESISTANT AND LABEL RECEPTIVE COATING AND METHOD OF PRODUCING SAME

BACKGROUND OF THE INVENTION

1. FIELD OF THE INVENTION

The present invention pertains to surface coating materials for glass surfaces. In particular, the present invention relates to a process for improving the scratch resistance and labelability of glass surfaces. A particular aspect of this invention relates to improved abrasion-resistant glass coatings which are label receptive and possess good printability without further treatment.

Glass derives its considerable strength from an unblemished pristine surface and any scratches or flaws which are present on its surface decrease its strength to a fraction of its original value. Generally, glass containers such as jars, bottles and tumblers, and the like, exhibit maximum strength immediately upon forming, and this strength decreases as the containers come into contact with each other and with other surfaces in the course of manufacturing, filling, packaging and shipping.

After glass surfaces are coated with a composition having good wet and dry scratch and abrasion resistance properties, which by imparting such scratch resistance decreases the likelihood of breakage, more glass containers can be handled by the filling and packaging apparatus in the same amount of time by spacing the containers closer together and increasing the speed of the article handling conveyors even though the glass surfaces will be subject to more contact with other surfaces. Since many products are packaged under pressure, such as beer and carbonated beverages, it is highly desirable that the surfaces of glass containers possess as few scratches as possible to minimize or prevent the possibility of breakage.

It is known in the art that if the glass surfaces are coated with a composition which exhibits such abrasion-resistance and to which labels readily adhere, and also which possess good printability without further treatment, such compositions would represent a substantial contribution to the art.

2. DESCRIPTION OF PRIOR ART

Worthwhile attempts have been made in the past to increase the strength of glass containers by coating their exterior surfaces with a polyethylene coating. While polyethylene does produce a good essentially-transparent coating, its inherent hydrophobic nature makes it a poor surface for adhering labels, inks and decorations. It has been found that by using selected copolymers which possess increased polarity in reference to the respective monomer, it is possible to overcome the disadvantages associated with the prior art, that is the mixture of particular organic resins or polymers employed herein increase the scratch resistance of the glass surfaces which are also more receptive to the adherence of printing inks and labels.

U.S. Pat. No. 2,995,533 to Parmer and Schaefer, issued Aug. 8, 1961, entitled, "Lubricant Coating For Glassware", and U.S. Pat. No. 3,554,787 to Plymale, issued Jan. 12, 1971, entitled "Glass Articles Having Dual Scratch And Abrasion Resistant Coating And Method For Producing Same", assigned to the same common assignee as the present application, relate to glass surface coatings which involve single and dual coatings of polymers, respectively. The former discloses the use of polyethylene emulsion as a lubricant coating, while the latter discloses a tin or titanium oxide first coating which is overcoated with a second coating of organic copolymers. Both of these disclosures involve coatings which are abrasion resistant but which have experienced labeling problems.

Other patents which relate to glass surface coatings are the following: U.S. Pat. Nos. 3,323,889 and 3,368,915 to Carl and Steigelman relate to abrasion-resistant glass articles having dual protective coatings and method of forming same. Also, U.S. Pat. Nos. 3,414,429, 3,598,632 and 3,418,154 all relate to methods of rendering glass surfaces abrasion resistant; however, all are devoid of teachings which in addition provide the surfaces with good label adhesion and printability. Also, all of the above-listed patents are originally assigned to the same assignee as the present application.

SUMMARY OF THE INVENTION

Accordingly, it is an object of the present invention to provide an abrasion resistant coating composition which will afford protection to a glass surface against abrasive action, as well as assist in providing good lubricity and labelability.

Another object of this invention is to provide a thin, substantially-transparent dual coating on a glass surface, which dual coating is highly resistant to scratching and abrasion while simultaneously maintaining the strength characteristics of the glass.

Another object of this invention is to provide a method of coating glass surfaces, such as the major exterior side surfaces of a glass container, in order to impart scratch resistance, lubricity and label adhering properties, thus permitting the container to undergo normal handling, processing and shipping with the inherent rubbing of the glass surface with like and other surfaces without significantly decreasing the strength of the container.

Still a further object of this invention is to provide a coating for glass surfaces which has desirable printability and label adhesion properties without further treatment.

DESCRIPTION OF THE PREFERRED EMBODIMENT

In obtaining the objects of this invention, one feature resides in treating a glass surface with a titanium or tin compound which is pyrolyzable, that is, chemically decomposed by the action of heat to form oxides of the metal on the glass surface while the surface is at a temperature above the pyrolyzing temperature of the compound, cooling the treated glass, such as in an annealing lehr, and applying to said cooled surface a second coating composition which latter coating contains at least two different polymers. The selected titanium or tin compound may also be hydrolytically decomposed; however, it is preferred that thermal decomposition be employed when the compound or compounds contact the hot glass surface immediately after forming.

In carrying out the instant invention, the glass article of commerce is first treated soon after the article leaves the glass forming machine and as it is being conveyed to the annealing lehr. A solution of the pyrolyzable compound is sprayed onto the exterior surface of the glass at a temperature above the pyrolyzing temperature of the compound. The pyrolyzing temperature for titanium and tin compounds is between about 700° F. and 1300° F.

The titanium compound employed in this invention is one which upon contact with the heated glass surface will react to form titanium oxide. Among the titanium compounds suitable for the purpose of this invention are volatile metallo-organic compounds such as the alkyl titanates, preferably where the alkyl group has from 1 to 8 carbon atoms. Among the alkyl titanates that may be used are tetrabutyl titanate, tetraisopropyl titanate, tetrakis (2-ethylhexyl) titanate, tetramethyl titanate, tetraethyl titanate, and the like. Also included among the suitable titanium containing compounds are the titanium tetrahalides and particularly titanium tetrachloride. Ammonium salts of titanium lactate are also suitable.

The tin compounds that may be used for the purpose of the present invention include stannic salts among which are the halides such as stannic chloride. Other stannous compounds include the salts of fatty acids such as oleate, stearate, palmitate, and the like.

As the glass articles, now coated with a thin metal oxide layer, enter the annealing lehr, they are progressively cooled over a period of time to about 400° F. and lower, where they are sprayed with a second coating of organic material containing at least two different polymers. Among the polymers that preferably may be employed for the purpose of this invention are a physical mixture of aqueous emulsions of acrylic resin and low molecular weight polyethylene resin.

Generally, the polymer resins that may be employed herein are those which are unaffected by light or air and show no visible signs of discoloration following their application. Also because of the polar nature of the selected polymers, the resins are receptive to printing and decorating inks. Among the commercially available polymers in emulsified form which may be employed are aqueous emulsions of a low-molecular weight high-density emulsifiable polyethylenes in which non-ionic emulsifiers are used. Such emulsion may be made using Allied Chemical Product No. AC-392 and prepared into an alkaline emulsion.

As stated, labelability problems have arisen on occasion using the aforesaid polyethylene emulsion alone and in combination with vinyl ester copolymers as the overcoat. It appears that total coverage of the exterior surfaces of the glass container by the polyethylene emulsion solids does not allow good adhesion to many forms of conventional labels used in the bottling and packaging industries. In considering prevailing theories of bonding, it is known that in the absence of polar groups in the overcoat, there must be some "islands" or localized regions of bare glass present for obtaining acceptable labelability.

In the present invention, at least two polymer resins in emulsified form are combined, one of which includes modified acrylic compositions, which provide good labelability with partial or total coverage of the glass surface, while retaining the high scratch resistance and lubricity of the polyethylene system. The overall acceptability properties of the surface can be obtained regardless of the primer, coupling agent or "texturizer" applied to the glass surface prior to the application of the lubricious coating.

The acrylic resin component is an aqueous emulsion of polyacrylates which contain some carboxyl functionality. Such materials are manufactured and sold by Rohm & Haas Company under the trade names "Acrysols" and "Acryloids". Some of these materials have limitations of having too low a molecular weight or not being Federal Drug Administration approvable for food and beverage contact due to their chemical composition. However, for the application involving exterior surface treatment of glass containers, some of the products designated as "Acrysols" and "Acryloids" can be used, and a preferred material is "Acrysol WS-50".

Acrylic coatings by their nature are inherently nonlubricious in considering the lubricity levels required for surface treatment of glass containers. One test of lubricity is an angle below 20° when a three-container pyramid on a plane is subjected to an increasing degree of inclination and the axial movement of the top container with respect to the other two is observed. It was assumed that the addition to the acrylate of certain amounts of a lubricious material such as a polyolefin, and more specifically, a low molecular weight high-density polyethylene, could improve lubricity without adversely affecting scratch resistance and labelability. It was found through test work and coating commercial bottles that this could actually be done. However, it was found that only non-ionically emulsified polyethylene could be used. The anionically emulsified polyethylenes, i.e., the "Duracote" type, may occasionally cause precipitation or coagulation of the polyacrylates due to pH changes.

This invention, therefore, involves various combinations of polyacrylate emulsions or dispersions and non-ionically emulsified low molecular weight high-density polyethylenes which are mixed together into a physical mixture. Acrysol WS-50 from Rohm & Haas Company and AC-316 from Allied Chemical Company are preferred components of such mixture.

Acrysol WS-50 is a water-solubilized acrylic polymer intended for general industrial coating use. Such material forms tough, glossy, water-resistant films at room temperature and are useful in various clear and pigmented coating applications. Being dispersed in water, these resins offer advantages in conforming to air pollution requirements and also in avoiding noxious odors associated with organic solvent systems. Such resins provide good flow, wetting and pigment grinding. The Acrysol WS-50 product has the appearance of a white to slightly-translucent liquid, a 38% solids content, a pH of 7.0 to 7.5, a density of 8.8 lbs/gallon, a glass transition temperature, $T_g$, of 36° C., and a minimum film formation temperature, MFT, of 50° F.

The viscosity of formulations using this product can be increased by using several techniques: either by the addition of basic materials such as ammonium hydroxide, triethylamine or other volatine amines which will thicken the system, or by the addition of water-miscible alcohols such as t-butanol, isopropanol or ethanol which can increase the viscosity. These materials should be added slowly with agitation to avoid localized high concentrations. Also, their use will improve pigment wetting and the flow of formulations based on such resins. For best stability, the pH should be kept alkaline.

Product No. AC-316 from Allied Chemical consists of oxidized homopolymers of polyethylene having a softening point (ASTM E-28) of 284° F., a hardness, dmm (ASTM D-5) of greater than 0.5, a density, g/cc (ASTM D-1505) of 0.98, a viscosity in cps at 149° C. (300° F.) (Brookfield) of 30,000, and an acid number, (mgKOH/g of resin), of 16. Also, Product No. 392 has a softening point of 280° F., a hardness, dmm, of greater than 0.5, a density, g/cc, of 0.99, a viscosity-cps, of 9000, and an acid number, mgKOH/g, of 28.

A conventional type of water emulsion of the A-C polyethylene is made using a non-ionically-emulsified system. Both of the aforesaid oxidized homopolymers of polyethylenes are emulsifiable in aqueous systems. Usually potassium hydroxide along with an organic, non-ionic emulsifier. Organic surfactants such as Igepal CO made by GAF Corporation, or a Triton surface active agent made by Rohm and Haas Company are also desirable for preparing the emulsion. In addition, the use of a pressure vessel is preferred to produce more uniform and smaller particle size of the dispersed resin.

The basic formulation of the non-ionic polyethylene (AC-316) emulsion is as follows:

|  | Parts by Weight |
| --- | --- |
| AC Polyethylene 316 | 40 |
| Igepal CO-360 | 10 |
| KOH 90% Flake | 1.0 |
| $Na_2S_2O_5$ | 0.4 |
| Water to 30% Solids | 120 |

Two emulsions set forth above, i.e., the AC Polyethylene 316 emulsion and the R&H acrylic WS-50 emulsion, are physically mixed into a resin solids ratio ranging from about 7:1 to 1:1. While the higher ratio of acrylic resin to polyethylene resin is preferred, a ratio of about 5:1 is particularly useful for coating glass containers.

In coating newly-formed glass containers which are initially coated with tin oxide, a second coating of the mixed acrylic and polyethylene resins was applied at a resin concentration of 0.2, the resins being in a ratio of 7 to 1. The containers were coated during a last stage of the annealing cycle, and preferably while at a temperature ranging from about 250° F. to 350° F. The coated containers showed extremely good scratch resistance of 100+ when tested both wet and dry, good lubricity as evidenced by an angle of sliding inclination of less than 20°, and excellent adhesion of virtually all types of machine applied labels. Among the various types of conventional labels tested were jelly gum, vinyldextrin, casein, modified dextrin, and Findlay. The containers were also capable of neck labeling with excellent results. Thus, the containers showed all of the desirable properties of scratch and abrasion resistance, both wet and dry, good lubricity, good closure removal torque, and excellent labelability with all common types of paper and plastic labels.

The wet and dry scratch resistance tests were similar to those set forth in U.S. Pat. No. 3,323,889 to Carl et al, which patent was originally assigned to the same assignee as the present invention, which disclosure is incorporated herein by reference. The coating also exhibited extremely good wet and dry scratch resistance after being subjected to a caustic solution.

Various modifications may be resorted to within the spirit and scope of the appended claims.

I claim:

1. In a method of increasing the scratch and abrasion resistance as well as the lubricity and labelability of a glass surface wherein pyrolyzable tin or titanium compounds are applied to a hot glass surface to form a tin or titanium oxide layer thereon and then an organic material is sprayed onto said oxide layer while at a lower elevated temperature, the improvement wherein said organic material comprises a label-accepting physical mixture of acrylic resin aqueous emulsion and low molecular weight polyethylene resin aqueous emulsion, said resins in said mixture varying from a solids ratio of about 7:1 to 1:1.

2. The method in accordance with claim 1, wherein said physical mixture of acrylic resin aqueous emulsion and polyethylene resin aqueous emulsion comprises a resin solids ratio of about 5:1.

3. The method in accordance with claim 1, wherein said physical mixture of organic material is applied with the glass surface at a temperature ranging from about 250° F. to 350° F.

4. The method in accordance with claim 1, wherein said physical mixture of organic material comprises acrylic resin emulsion and low molecular weight high-density polyethylene resin emulsion, which mixture is applied to an elevated temperature not in excess of about 380° F. to extend coextensively with said oxide layer to form a thin substantially-transparent uniform coating especially receptive to firm adherance of labels and printing inks.

5. As an article of manufacture, a coated glass article having a tin oxide or titanium oxide layer directly adhered to the surface of said glass article and an organic material applied over the said oxide layer comprising the decomposition product of a physical mixture of acrylic resin aqueous emulsion and low molecular weight polyethylene resin aqueous emulsion varying from a solids ratio of about 7:1 to 1:1, said coated article having exterior surfaces which are scratch and abrasion resistant, lubricious and especially receptive to labels and printing inks.

6. The article in accordance with claim 5, wherein said physical mixture of acrylic resin aqueous emulsion and low molecular weight polyethylene resin aqueous emulsion comprises a solids ratio of about 5:1.

7. The article in accordance with claim 5, wherein said oxide layer and said organic material extend coextensively over said article to form a thin, substantially-transparent, uniform coating.

8. The article in accordance with claim 5, wherein said article comprises a glass container having the said oxide layer and organic material extending over substantially all exterior side surfaces of its body portion in the form of a thin, substantially-transparent coating.

9. As an article of manufacture, a coated glass container having a tin oxide or titanium oxide layer directly adhered to the exterior surfaces of said glass container and an organic material applied over and coextensive with said oxide layer comprising a mixture of acrylic resin aqueous emulsion and a low molecular weight polyethylene resin aqueous emulsion varying from a solids ratio of about 7:1 to 1:1, said coated glass container being scratch and abrasion resistant, lubricious and receptive to firm adherance of labels and printing inks.

10. As an article of manufacture, an annealed glass container having a dual coating over its major exterior surfaces to improve its scratch and abrasion resistance, lubricity and receptivity to labels and printing inks, said dual coating comprising a tin oxide or titanium oxide layer directly adhered to the major exterior surfaces of said glass container and an organic material applied over and coextensive with said oxide layer, said organic material comprising the decomposition product of a physical aqueous mixture of acrylic resin emulsion and low molecular weight high-density polyethylene resin emulsion varying from a resin solids ratio of about 7:1 to 1:1, said organic material being applied by spraying said major exterior surfaces while at an elevated temperature ranging from about 275° F. to 350° F. during a latter stage of the annealing cycle to form a thin, substantially-transparent, uniform, dual coating.

* * * * *